US012678844B1

(12) United States Patent (10) Patent No.: US 12,678,844 B1
He et al. (45) Date of Patent: Jul. 14, 2026

(54) RECYCLING METHOD AND SYSTEM FOR BIOMASS RAW MATERIAL

(71) Applicants: Min He, Dongguan City (CN); Poxi He, Nanning City (CN); Lecheng Xiao, Hanchuan City (CN)

(72) Inventors: Poxi He, Nanning City (CN); Min He, Dongguan City (CN); Lecheng Xiao, Hanchuan City (CN)

( * ) Notice: Subject to any disclaimer, the term of this patent is extended or adjusted under 35 U.S.C. 154(b) by 0 days.

(21) Appl. No.: 19/228,677

(22) Filed: Jun. 4, 2025

(30) Foreign Application Priority Data

Feb. 24, 2025  (CN) .......................... 202510200900.9

(51) Int. Cl.
  B09B 3/60     (2022.01)
  B01D 29/11    (2006.01)
  B01D 29/90    (2006.01)
  B09B 3/38     (2022.01)
  B09B 101/70   (2022.01)

(52) U.S. Cl.
  CPC .............. B09B 3/60 (2022.01); B01D 29/117 (2013.01); B01D 29/906 (2013.01); B09B 3/38 (2022.01); B01D 2201/282 (2013.01); B09B 2101/70 (2022.01)

(58) Field of Classification Search
  None
  See application file for complete search history.

(56) References Cited

U.S. PATENT DOCUMENTS

| | | | | |
|---|---|---|---|---|
| 4,432,805 A | * | 2/1984 | Nuuttila | C13K 1/02 |
| | | | | 127/1 |
| 2008/0193994 A1 | * | 8/2008 | Choate | C12M 21/04 |
| | | | | 435/167 |
| 2014/0154759 A1 | * | 6/2014 | Retsina | C05F 17/00 |
| | | | | 110/235 |
| 2014/0178937 A1 | * | 6/2014 | Minamino | C12P 19/02 |
| | | | | 435/157 |
| 2015/0329926 A1 | * | 11/2015 | Kusuda | C12P 7/10 |
| | | | | 127/1 |
| 2017/0107159 A1 | * | 4/2017 | Hepner | C05F 17/964 |

* cited by examiner

*Primary Examiner* — William H. Beisner
(74) *Attorney, Agent, or Firm* — Bay State IP, LLC

(57) ABSTRACT

A recycling method for the biomass raw material includes: heating an original biomass raw material, and performing biochemical reaction and/or synthesis reaction on the heated biomass raw material according to a preset treatment condition, to obtain a primary recycled product of the biomass raw material; and performing cyclic shear filtration and/or ultrasonic enhanced dispersion on the primary recycled product to turn the primary recycled product into a secondary recycled product, wherein the secondary resource product includes a solid biomass portion and a liquid biomass portion; the solid biomass portion is returned to the biochemical reaction step; and the liquid biomass portion waits for packaging or the liquid biomass portion waits for packaging after being concentrated. A complete set of equipment included in the system is miniaturized and can be widely used in various scenes that require nearby or on-site solutions for biomass raw material recycling.

4 Claims, 4 Drawing Sheets

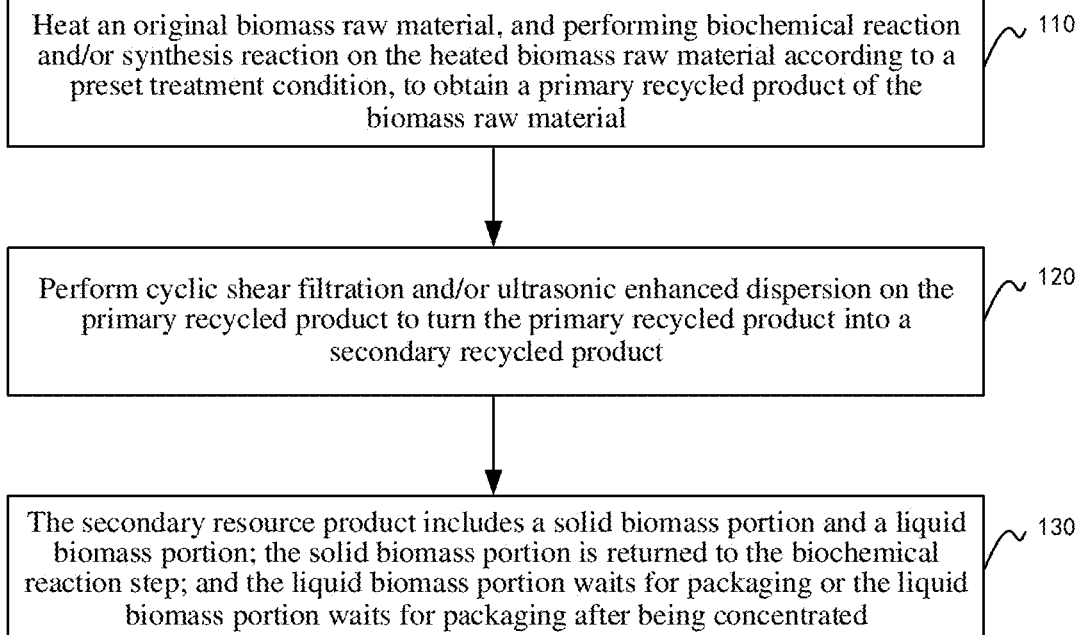

| Heat an original biomass raw material, and performing biochemical reaction and/or synthesis reaction on the heated biomass raw material according to a preset treatment condition, to obtain a primary recycled product of the biomass raw material | ~ 110 |

| Perform cyclic shear filtration and/or ultrasonic enhanced dispersion on the primary recycled product to turn the primary recycled product into a secondary recycled product | ~ 120 |

| The secondary resource product includes a solid biomass portion and a liquid biomass portion; the solid biomass portion is returned to the biochemical reaction step; and the liquid biomass portion waits for packaging or the liquid biomass portion waits for packaging after being concentrated | ~ 130 |

FIG. 1

RECYCLING METHOD AND SYSTEM FOR BIOMASS RAW MATERIAL

CROSS REFERENCE TO RELATED APPLICATION

This application claims the benefit of and takes priority from Chinese Patent Application No. 202510200900.9 filed on Feb. 24, 2025, the contents of which are herein incorporated by reference.

TECHNICAL FIELD

The present disclosure relates to the technical field of biomass raw material treatment, and in particular, to a recycling method and system for a biomass raw material.

BACKGROUND

All the countries around the world have invented and produced various types of treatment equipment for biomass raw materials and wastes such as inferior food produced in food processing factories, beverage juice factories, medicinal material processing factories, distilleries, bean products factories, pre-cooked food factories, and the like, expired food, vinasse, bean dregs, peeled flesh (such as Chenpi and other medicinal and edible products) and pomace or peels, leftover vegetables, medicinal dregs, extracted slag, and straws, and for biomass organic wastes and inorganic wastes such as active sludge, kitchen wastes, human, livestock and poultry manure, and crop straws of urban medium and large-sized supermarkets, community villages and towns, factories, farmlands, and sewage treatment plants. However, existing equipment or methods often use fermentation methods and equipment for incineration or fermentation methods and equipment for adding biological microbial strains.

For example, biomass or its wastes are treated at a normal temperature or by being heated to 60° C., and even by short-term fermentation of high-temperature bacterial strains reaching 80-90° C. Alternatively, the biomass or its wastes are treated by a method disclosed in patent CN114437833A or through a method or process such as gasification reaction in a carbonization reactor.

However, the main problems in the current methods are that it is difficult to achieve a good resource recycling result. Burning or fermentation still produces or accompanies a large number of wastes, and requires secondary treatment or even many instances of treatment such as landfilling or incineration. During the treatment, there are a large amount of greenhouse gas, harmful gas, and substances such as odors or peculiar smells, which pollute the ecological environment such as atmospheric water and soil. The gasification reaction process consumes a lot of energy, and the technological process is complex, costly, and harmful. Some technological processes have high energy consumption and great limitation on adaptability to a specific scene.

At present, the industry urgently needs a method, equipment, and system that can solve the above problems, especially those that can be conveniently applied to various scenes requiring nearby or on-site solutions of biomass raw material recycling.

SUMMARY

In view of this, the present disclosure aims to provide a recycling method and system for a biomass raw material, which have low energy consumption, a high recycling rate, and a wide range of application scenes.

Based on the above objective, the present disclosure provides a recycling method for a biomass raw material. The recycling method for the biomass raw material includes:

heating an original biomass raw material, and performing biochemical reaction and/or synthesis reaction on the heated biomass raw material according to a preset treatment condition, to obtain a primary recycled product of the biomass raw material; and performing cyclic shear to further complete the bonding between mineral elements and organic elements, that is the organic chelation, to realize the organic transformation of mineral nutrient elements. Then filtration and/or ultrasonic enhanced dispersion on the primary recycled product to turn the primary recycled product into a secondary recycled product, wherein the secondary resource product includes a solid biomass portion and a liquid biomass portion; the solid biomass portion is returned to the biochemical reaction step; and the liquid biomass portion waits for packaging or the liquid biomass portion waits for packaging after being concentrated.

Based on another objective of the present disclosure, during the performing cyclic shear and completing the organic chelation, after filtration and/or ultrasonic enhanced dispersion on the primary recycled product, some filter residues that do not enter a next step are produced; and the filter residues are returned to the biochemical reaction and/or synthesis step performed according to the preset treatment condition for further treatment.

Based on another objective of the present disclosure, the recycling method further includes a heat recovery and use step:

using and recovering heat generated in the biochemical reaction and/or synthesis reaction stage, the cyclic shear filtration and/or ultrasonic enhanced dispersion stage, and an evaporative concentration stage and heat generated in the material itself, such as external heating, material shearing motion, and other heat that are contained in the material but no longer have any effect and need to be discharged into the environment, and providing heat energy to a heating stage and the biochemical reaction and/or synthesis reaction stage through a heat exchange equipment system.

Based on another objective of the present disclosure, the recycling method further includes:

screening and classifying the original biomass raw material to obtain a screening and classification result;

during the performing biochemical reaction or synthesis reaction on the heated biomass raw material according to the preset treatment condition, adding, according to the classification result, an element and component that are matched with the classification result; and when the biomass liquid portion is concentrated and waits for packaging, transporting the biomass liquid portion to a finished product line for packaging according to the element and component that are matched with the classification result.

Based on another objective of the present disclosure, when the original biomass raw material includes a biomass water-containing material, an impurity removal step and a crushing and pulping step are performed on the type of original biomass raw material to turn the original biomass raw material into a biomass water-containing material with a particular water content; and when the biomass water-containing material is put into a biochemical synthesis reaction tank for biochemical reaction, a heating temperature of an external source heat pump and/or a heating device is controlled at 70° C. to 130° C.; a heating reaction temperature of the biochemical synthesis reaction tank is controlled at 70° C. to 150° C.; a pressure is controlled at 0.5 Mpa to 1 Mpa; and reaction time is controlled at 0.5 h to 4 h.

In a second aspect, the present disclosure further provides a recycling system for a biomass raw material, including:

a biomass material storage tank, a heating subsystem, a pressurization subsystem, a biochemical synthesis reaction tank, a stirring subsystem, dosing equipment, a composite reaction tank, a cyclic shear filtration and ultrasonic linkage unit, a filter residue tank, a filtrate tank, concentration equipment, a waste heat storage tank, and an upper control unit that is in communicative connection to the above components, wherein the heating subsystem cyclically heats a biomass water-containing material and transports the biomass water-containing material to the biochemical synthesis reaction tank; a heating temperature of an external source heat pump and/or a heating device is controlled at 70° C. to 130° C., and dosing equipment quantitatively transports a biochemical promoter and macro, medium and micro element additives into the biomass raw material tank, or the biochemical synthesis reaction tank, or the composite reaction tank through a pipeline pump valve; the stirring subsystem arranged in advance in the tank performs variable-speed stirring or gradient stirring. The specific classifications are as follows: The macro element refer to element that is in high demand for crops, such as nitrogen, phosphorus, and potassium. The medium element refers to element that is in lower demand than the micro element, such as calcium, magnesium, and sulfur. The micro element refers to element that is in low demand but indispensable for crops, such as iron, manganese, copper, zinc, and boron.

heating equipment arranged inside the biochemical synthesis reaction tank is turned on to continue to perform heating to a set temperature; an air heat pump is turned on to perform pressurization to a set pressure; after a preset treatment condition including the set temperature, the set pressure, set reaction time, and the like is satisfied, a discharge valve of the biochemical synthesis reaction tank is opened to discharge a primary recycled product formed after treatment into the composite reaction tank through a pressure pipeline;

the discharge valve is connected to a material inlet of the cyclic shear filtration linkage unit, and a material outlet of the cyclic shear filtration linkage unit is connected to a material inlet of the composite reaction tank through a pipeline valve; after cyclic shear filtration and ultrasonic enhanced dispersion are completed, the primary recycled product is turned into a secondary recycled product; solid biomass filter residues in the secondary recycled product enter the filter residue tank and return to be mixed with a new batch of biomass raw material for retreatment;

the liquid biomass portion in the secondary recycled product enters the filtrate tank to be directly used as a finished product to be packaged according to a product need, or is transported to the concentration equipment for concentration;

material heat and concentrated material waste heat in the biochemical synthesis reaction tank and the composite reaction tank are recovered and used, and concentrated liquid obtained after concentration is completed is automatically transported into a concentrate tank as a finished product to be packaged.

As can be seen from the above, the recycling method and system for the biomass raw material provided by the present disclosure have a scientifically appropriate treatment process, and the entire flow has a short treatment time. Generally, it takes 4 to 8 hours (an average of 6 hours) to treat a batch of original biomass raw materials at once, without producing polluting gas or wastewater and waste residues. Different types of biomasses are classified to achieve different recycling results, thereby achieving high recycling efficiency and a good recycling benefit.

BRIEF DESCRIPTION OF THE DRAWINGS

To describe the technical solutions in the present disclosure or in the related art more clearly, the following briefly introduces the accompanying drawings for describing the embodiments or the related art. Apparently, the accompanying drawings in the following description show merely the embodiments of the present disclosure, and a person of ordinary skill in the art may still derive other drawings from the accompanying drawings without creative efforts.

FIG. 1 is a basic flowchart of a recycling method for a biomass raw material according to an embodiment of the present disclosure;

DETAILED DESCRIPTION OF THE EMBODIMENTS

Figure 2:
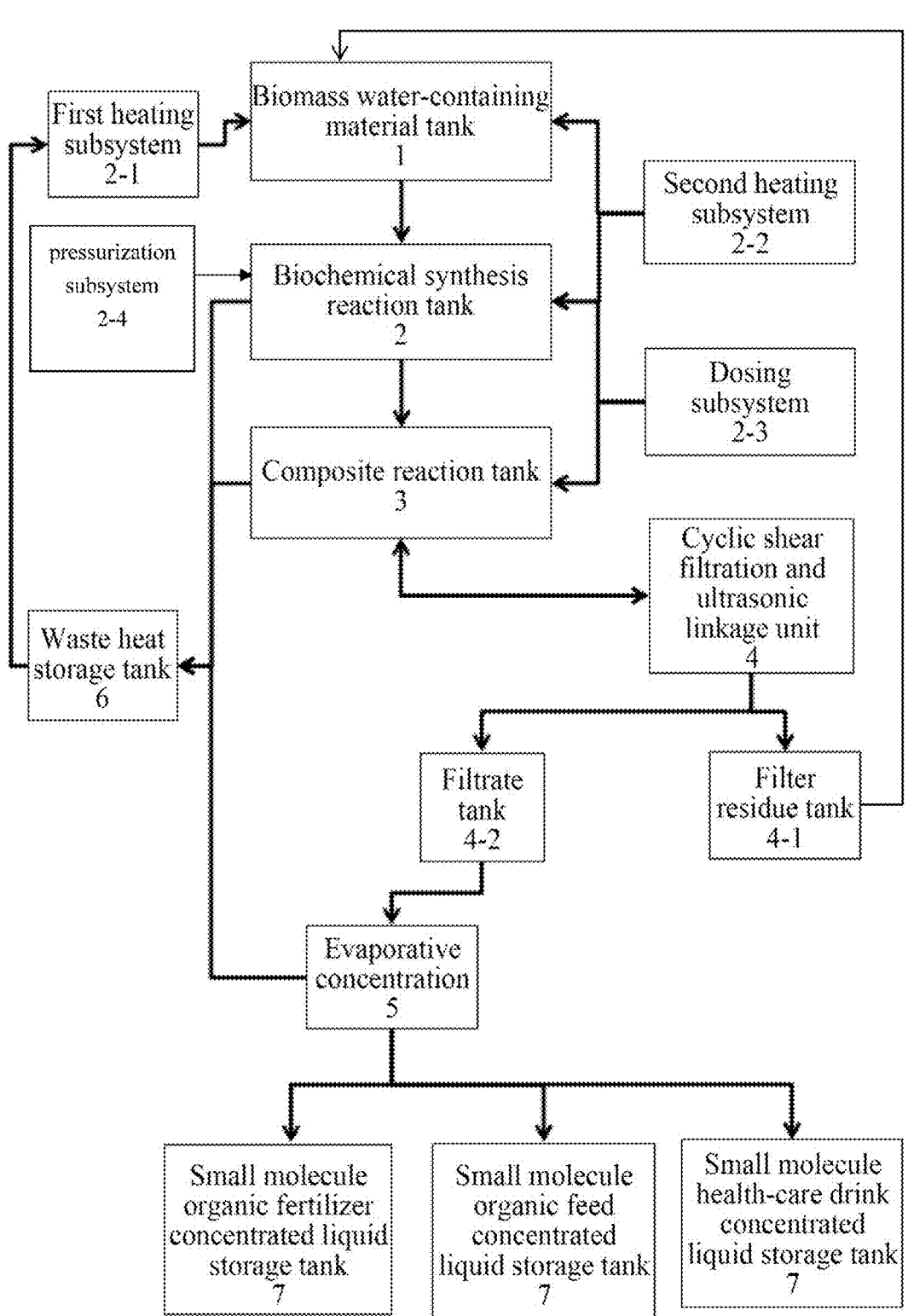
FIG. 2 is a basic diagram of a technological process of equipment according to an embodiment of the present disclosure.

In order to make the objectives, technical solutions, and advantages of the present disclosure clearer, the following is a further detailed explanation of the embodiments of the present disclosure in conjunction with the accompanying drawings.

It should be noted that unless otherwise defined, technical or scientific terms used in the embodiments of the present disclosure should have the ordinary meanings as understood by those of ordinary skill in the art to which the present disclosure belongs. The terms "first", "second", and the like used in the embodiments of the present disclosure do not indicate any order, quantity, or importance, but are only used to distinguish different components. The term "include", "contain", or another other similar term means that the elements or objects stated before them encompass the elements or objects and equivalents thereof listed after them, but do not exclude other elements or objects. The term such as "connect" or "connection" is not limited to physical or mechanical connection, but can include electrical connection, whether direct or indirect. The terms "upper", "lower", "left", "right", and the like are merely used to indicate relative positional relationships. After the absolute position of a described object changes, the relative positional relationship may alternatively change accordingly.

It should be noted that a method of the embodiments of the present disclosure may be executed by single equipment, such as a computer or a server that is used as an upper computer control cabinet of the present disclosure.

Effects of the "cyclic shear filtration and ultrasonic linkage unit" in the device are further combined to produce micro-nano new small molecule organic products. Improvement of an application effect can be summarized as biochemical synthesis and recycling.

A recycling method and system for a biomass raw material of the present disclosure are suitable for scenes that require processing or reprocessing of a biomass raw material. After a series of steps, with long energy consumption and at short time, various recycling results are finally achieved and put into use.

In a feasible implementation of an exemplary embodiment of the present disclosure, in conjunction with FIG. 1, the recycling method for the biomass raw material includes the following steps:

In step 110, after an original biomass raw material is heated, biochemical reaction or synthesis reaction is performed on the heated biomass raw material according to a preset treatment condition, to obtain a primary recycled product of the biomass raw material.

The biomass raw material is used as an original material in the technological method or system device of the present disclosure, and there is a wide variety of biomass raw materials, for example: secondary products of food processing factories, raw materials and dregs of animal and plant medicinal materials, leftover vegetables and fruits of fruit and vegetable processing, fruit residues obtained after juicing fruits in juice factories, discarded fresh fruit flesh, shells, and peels, vegetable residues obtained after processing vegetables into vegetable juice, rice bran residues produced by processing foodstuff in foodstuff processing factories, protein-containing powder obtained by vermicelli processing, starch processing, and cassava processing; fresh albumen powder of starch processing factories, leftover fresh bean dregs obtained by soybean product processing, fermentation liquor produced by fermentation of vinasse, organic acid, and ethyl alcohol of wine factories; waste sludge obtained after processing products by using plant raw materials, biomass medicinal residues of pharmaceutical factories, kitchen wastes, active sludge, human, livestock and poultry manure, crop straws, sawdust of forestry leftovers, leaves, branches, waste matrixes for culturing biological bacteria, and other biomass raw materials and their wastes.

Biochemical catalytic hydrolysis reaction of a biochemical synthesis reaction tank in the device is summarized as biochemical, and dynamic self-synthesis of various mineral elements such as macro elements, medium elements, and micro elements to obtain new small molecule organic compounds is summarized as synthesis.

The preset treatment condition of the original biomass raw material includes: in a heating stage, heating a heated original water-containing material to 70° C. to 130° C.; in a biochemical reaction stage, mixing a biochemical promoter and the macro, medium, and micro elements with the primary recycled product; and controlling a pH value of the biochemical reaction tank to 2 to 4. Reaction conditions of the biochemical reaction tank include: a temperature of 70° C. to 150° C., a pressure of 0.5 Mpa to 1 Mpa, and reaction time of 0.5 h to 4 h.

In step 120, cyclic shear filtration and/or ultrasonic enhanced dispersion is performed on the primary recycled product to turn the primary recycled product into a secondary recycled product.

In a feasible implementation of an exemplary embodiment of the present disclosure, the primary recycled product may be a biomass water-containing material that includes a heated state of a mixture of at least one or two of food factory treated products or sludge in organic biomass wastes, biomass medicinal dregs of pharmaceutical factories, fresh vinasse of wine factories, reusable fresh fruit residues of food industries, fresh vinegar residues, fresh vegetable residues, fresh bean dregs of soybean product factories, leftover vegetables and leftover fruits of fruit and vegetable factories, kitchen wastes, human, livestock and poultry manure, crop straws, sawdust of forestry wastes, leaves, and the like. Impurity removal, and crushing and pulping are performed on the above biomass raw material or the water-containing material of wastes of the biomass raw material to obtain a material with a water content of about 80%, and the material is used as the biomass water-containing raw material.

The secondary recycled product may be: Biomass recycling may respectively make basic raw materials such as fertilizer, feed, drink, juice, vegetable juice, and bean juice according to different types of biomass raw materials and different elements and components that are added. A consumer market-oriented final product, such as small molecule organic water-soluble fertilizer, small molecule organic water-soluble feed, small molecule water-soluble drink or juice, vegetable juice, bean juice, and other food and healthcare products, can be finally obtained through steps of further disinfection, evaporation, filtration, and the like.

In step 130, the secondary resource product includes a solid biomass portion and a liquid biomass portion; the solid biomass portion is returned to the biochemical reaction step; and the liquid biomass portion is directly packaged according to product requirements or is packaged in a liquid state after being concentrated or is pelleted and packaged.

In a feasible implementation of an exemplary embodiment of the present disclosure, the solid biomass portion is filter residues, and the liquid biomass portion is filtrate. During concentration for packaging, the solid biomass portion and the liquid biomass portion are adaptively packaged according to different classification results.

In some scenes of an exemplary embodiment of the present disclosure, the liquid biomass portion may be directly used without evaporative concentration. That is, evaporative concentration may be performed according to a specific scene. The following will make an explanation in conjunction with examples.

With reference to FIG. 2 showing a schematic structural diagram of a recycling system for a biomass raw material according to the present disclosure. The recycling system is a whole combined set of equipment system composed of functional modules or devices according to the present patent method, including: a biomass water-containing material tank 1, a biochemical synthesis reaction tank 2, a heat exchange heating pump used as a first heating subsystem 2-1, a heater used as a second heating subsystem 2-2, dosing equipment used as a dosing subsystem 2-3, a pressurization subsystem 2-4, a composite reaction tank 3, a cyclic shear filtration and ultrasonic linkage unit 4, a filter residue tank 4-1, a filtrate tank 4-2, concentration equipment used evaporative concentration equipment 5, a waste heat storage tank 6, various types of small molecule concentrated liquid storage tanks 7, and an upper control unit.

A control logic of the upper control unit for the subsystems or equipment in a treatment process is as follows: Through an intelligent electrical control system, such as AI etc, the control unit controls preset production requirements such as time, temperature, pressure, speed, ingredient, water content, pH value, particle size, reaction mode, stirring mode, and finished product packaging for data such as a temperature sensor, a pressure sensor, a weighing sensor, a mass sensor, a liquid level sensor, a particle size sensor, a viscosity sensor, and a pH value sensor that are arranged in the equipment or the subsystems.

Based on another objective of the present disclosure, during the performing cyclic shear filtration and/or ultrasonic enhanced dispersion on the primary recycled product, some filter residues that do not enter a next step are produced; and the filter residues are returned to the biochemical reaction step performed according to the preset treatment condition for further treatment.

Based on another objective of the present disclosure, the recycling method further includes a heat recovery and use step:

recovering heat generated in the biochemical reaction stage, the composite reaction stage, and the evaporative concentration stage, and cyclically providing heat energy to the heating stage and the biochemical reaction stage through a heat exchange subsystem.

Based on another objective of the present disclosure, the recycling method further includes:

classifying the original biomass raw material to obtain a classification result;

during the performing biochemical reaction or synthesis reaction on the heated biomass raw material according to the preset treatment condition, adding, according to the classification result, an element and component that are matched with the classification result; and when the biomass liquid portion is concentrated and waits for packaging, transporting the biomass liquid portion to a finished product line for packaging according to the element and component that are matched with the classification result.

Based on another objective of the present disclosure, when the original biomass raw material includes a biomass water-containing material, an impurity removal step and a crushing and pulping step are performed on the type of original biomass raw material to turn the original biomass raw material into a biomass water-containing material with a particular water content; and when the biomass water-containing material is put into a biochemical synthesis reaction tank for biochemical reaction, a heating temperature of an external source heat pump is controlled at 70° C. to 130° C.; a heating temperature of the biochemical synthesis reaction tank is controlled at 70° C. to 150° C.; a pressure is controlled at 0.5 Mpa to 1; and reaction time is controlled at 0.5 h to 4 h.

According to the method of the present disclosure, average treatment time of a whole batch of original materials is about 6 h, so that the time is short, and the energy consumption is low. No odor and greenhouse gas will be discharged in the whole treatment process.

Products such as small molecule organic fertilizer, small molecule organic feed, small molecule fruit and vegetable drink, and nutritional health-care products are respectively produced according to different biomass types, so that value-increased high-benefit and high-efficiency recycling is achieved.

Waste heat and filter residues can be treated cyclically, without producing waste water and waste residues.

A temperature range controlled in the technological treatment process of the present disclosure is generally 70° C. to 130° C., and the heating temperature is controlled by the external source heat pump and/or a heating device. "Two instances of heating" means that the heat pump heats the biomass water-containing material to 70° C. to 150° C. for the first time, which saves energy by 30% or above when compared with heating by conventional external source steam. Based on the first heating temperature of 70° C. to 130° C., the biomass water-containing material is heated for the second time to 115° C. to 150° C. in the biochemical synthesis reaction tank. This belongs to heating with a temperature difference of 20° C. to 45° C., which saves energy by 30% or above when compared with heating by conventional external source steam or electric heating. By the implementation of the two instances of heating, the whole set of equipment system can save energy by about 60%, so that the energy saving benefit is outstanding. In the above combination of these devices, power-driven devices are all intelligently controlled by an intelligent control cabinet, to save labor resources.

Under a particular condition, the above second heating temperature is 115° C. to 130° C. However, in some more specific or preferred scenes, the efficiency is the highest if the above second heating temperature is 150° C., but the energy consumption is higher. Therefore, a more preferable solution of the present disclosure is the second heating temperature is between 115° C. and 130° C., which can balance the efficiency and the energy consumption, and the equipment investment is good.

A biochemical promoter and/or catalyst and macro, medium, and micro element additives are respectively transported by the dosing equipment through a pipeline pump valve into the original biomass material storage tank or the biochemical synthesis reaction tank or the composite reaction tank, and are then stirred through stirring equipment with a speed changing function or stirring equipment with a gradient function, which is arranged in the tank.

In a feasible implementation of an exemplary embodiment of the present disclosure, preferably, the heat pump 2-1 is used to cyclically heat the biomass water-containing material to 70° C. to 95° C. After the heating is completed, the heated biomass water-containing material is transported to a material inlet of the biochemical synthesis reaction tank 2 for feeding through a pipeline pump valve. Then, the dosing equipment 2-3 is used to sequentially quantitatively input the biochemical promoter and various macro, medium, and micro elements into the material inlet of the biochemical synthesis reaction tank 2. After dosing, transportation, and feeding are completed, the material inlet is closed, and a heater inside the biochemical synthesis reaction tank 2 is turned on to continue heating to 115° C. to 150° C. After that, the heater is turned off. A pressure-bearing tube of a pressurization subsystem 2-4 is used to pressurize an air inlet of the biochemical synthesis reaction tank 2 to 0.5 Mpa to 1 Mpa. After the pressurization time of biochemical synthesis reaction tank 2 is controlled to 0.5 h to 4 h, a discharge valve is opened. The material is automatically transported to a material inlet of the composite reaction tank 3 through a pipeline valve. After feeding, a material outlet of the composite reaction tank is connected to a material inlet of cyclic shear filtration and ultrasonic linkage unit 4. A material outlet of the cyclic shear filtration and ultrasonic linkage unit is connected to the material inlet of the composite reaction tank 3 for cyclic shear filtration and ultrasonic treatment. A speed of a circulating device is controlled between 3000 rpm and 8000 rpm, and a filtration speed is controlled between 5 m/h and 30 m/h.

Time for cyclic shear filtration and ultrasonic treatment is controlled between 0.5 h and 3 h. A residue discharge valve of a filtering device is opened to discharge filter residues to 4-1, and the filter residues from 4-1 are returned to be mixed with a new material for retreatment. A filtrate discharge valve of the filtering device is opened to discharge filtrate to 4-2. A material outlet of 4-2 is then transported to a material inlet of 5 through a pipeline pump valve for concentration by known evaporative concentration equipment. Waste heat enters 6 and is transported to the heat pump 2-1 through a pipeline valve to heat a cold end, which implements heat recovery and use. Concentrated liquid from the evaporative concentration equipment 5 enters the concentrated liquid storage tank 7 to complete a production process. According to different types, properties, and ingredients of the biomass water-containing material and different finished product requirements, small molecule organic fertilizer, small molecule organic feed, small molecule organic nutritional food, health-care drinks, and the like can be made separately.

Based on the same invention concept, corresponding to any of the above embodiment methods, the present disclosure further provides a complete set of equipment system for recycling a biomass raw material, including:

a biomass material storage tank, a heating subsystem, a pressurization subsystem, a biochemical synthesis reaction tank, a stirring subsystem, dosing equipment, a composite reaction tank, a cyclic shear filtration and ultrasonic linkage unit, a filter residue tank, a filtrate tank, concentration equipment, a waste heat storage tank, and an upper control unit that is in communicative connection to the above components.

Heating equipment belongs to a part of the heating subsystem, and pressurization equipment belongs to a part of the pressurization subsystem.

The heating subsystem cyclically heats a biomass water-containing material and transports the biomass water-containing material to the biochemical synthesis reaction tank; the dosing equipment quantitatively transports a biochemical promoter and macro, medium, and micro element additives into the biochemical synthesis reaction tank through a pipeline pump valve for stirring through a stirring system in the tank.

The heating equipment arranged inside the biochemical synthesis reaction tank is turned on to continue to perform heating to a set temperature; an air heat pump is turned on to perform pressurization to a set pressure; after a preset treatment condition including the set temperature, the set pressure, set reaction time, and the like is satisfied, a discharge valve of the biochemical synthesis reaction tank is opened to discharge a primary recycled product formed after treatment into the composite reaction tank at one time through a pressure pipeline.

Figure 3:
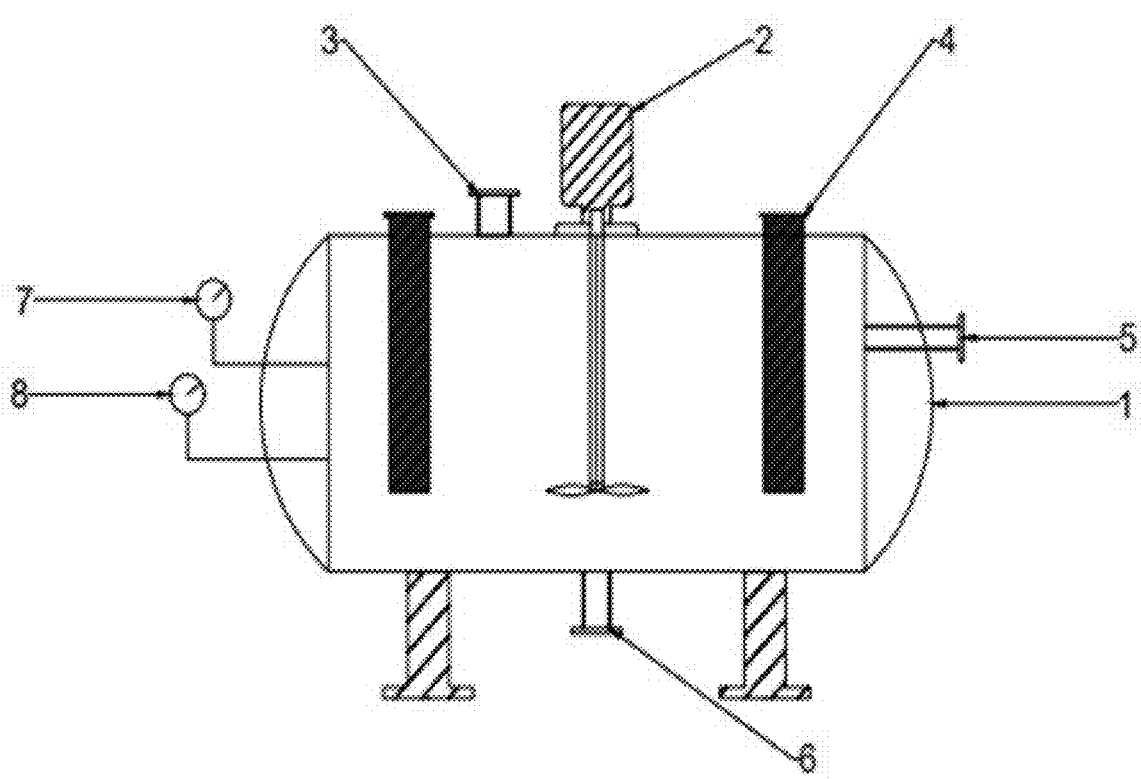
FIG. 3 is a schematic structural diagram of a biochemical synthesis reaction tank according to an embodiment of the present disclosure.
Figure 4A:
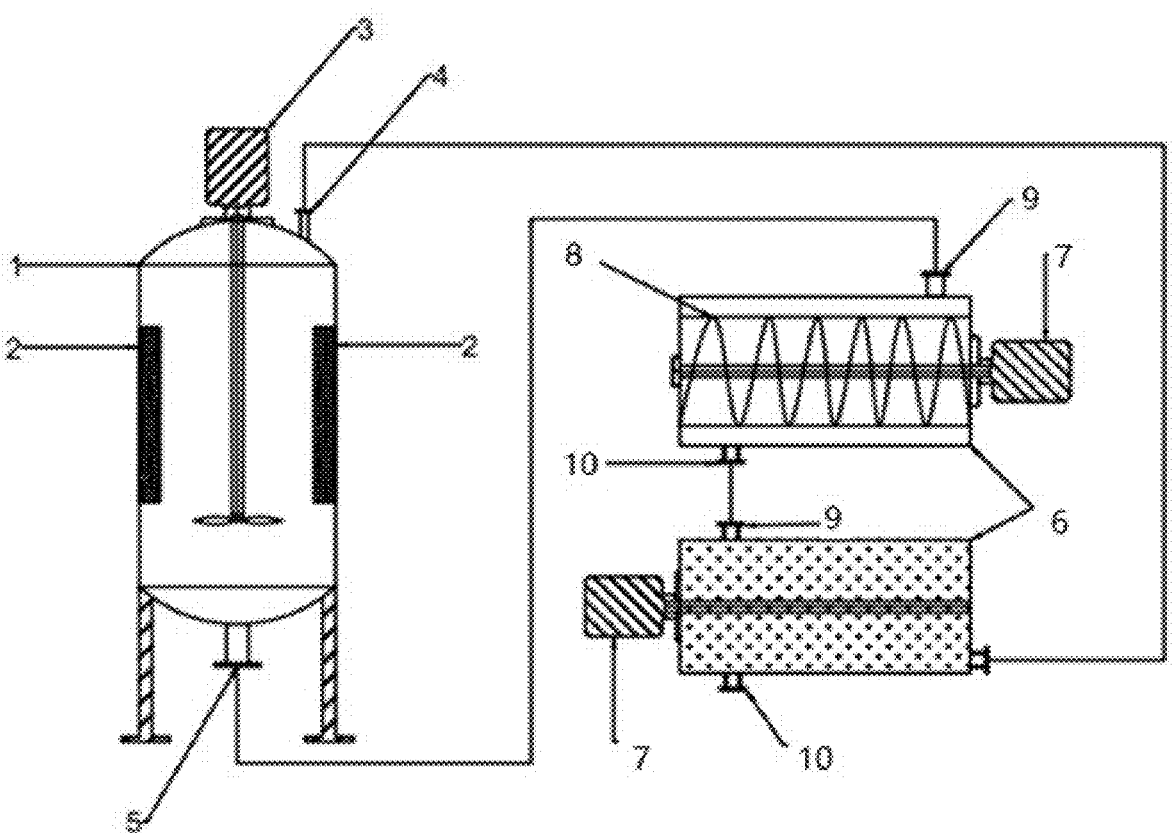
FIG. 4A and FIG. 4B are respectively schematic structural diagrams of two different forms of a composite reaction tank and a cyclic shear filtration and ultrasonic enhanced dispersion linkage unit.
Figure 4B:
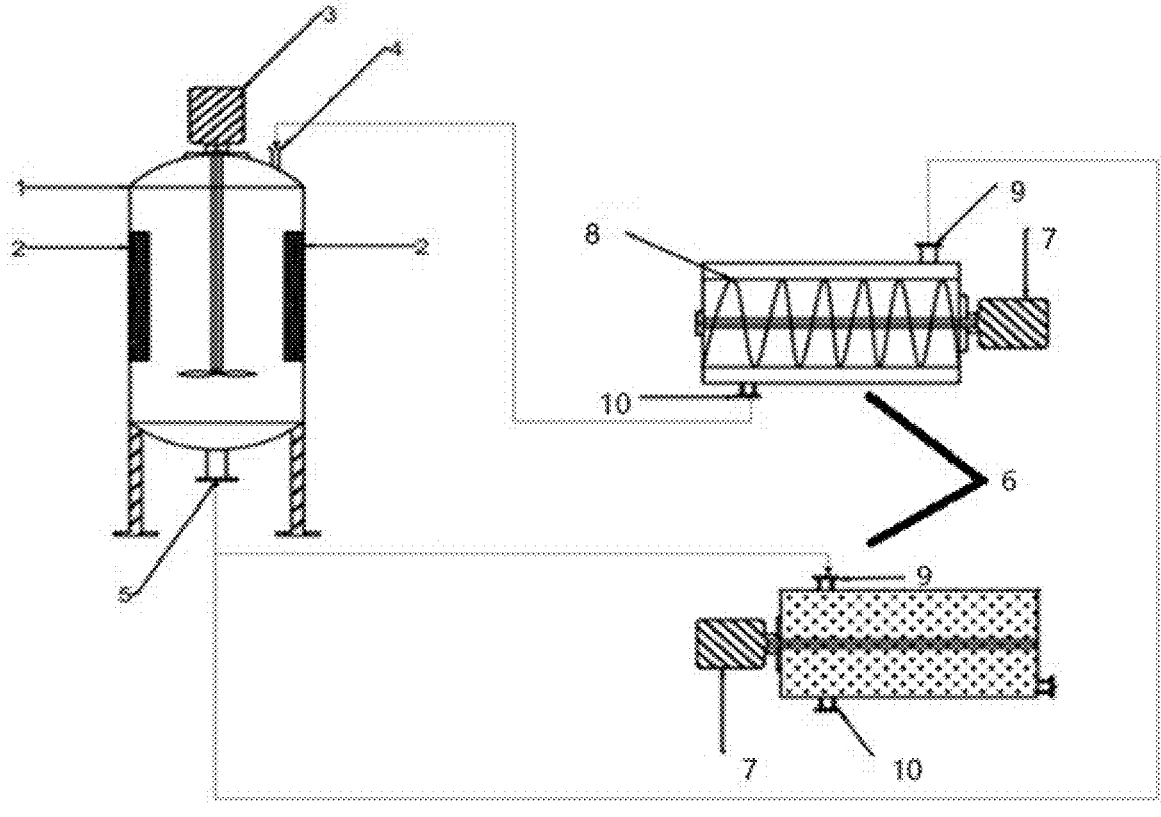

With reference to FIG. 3 showing a schematic structural diagram of a biochemical synthesis reaction tank and FIG. 4A and FIG. 4B that show schematic structural diagrams of a composite reaction tank and a cyclic shear filtration and ultrasonic enhanced dispersion linkage unit. In FIG. 3, 1 stands for a tank body of biochemical synthesis reaction tank; 2 stands for an electric stirrer; 3 stands for a material inlet; 4 stands for a heater; 5 stands for a safety valve; 6 stands for a safety outlet; 7 stands for a thermometer; and 8 stands for a pressure gauge. In FIG. 4A, 1 stands for a tank body of composite reaction tank; 2 stands for an ultrasonic equipment unit; 3 stands for an electric stirrer; 4 stands for a material inlet; 5 stands for a material outlet; 6 stands for a unit body of cyclic shear filtration and ultrasonic enhanced dispersion linkage unit; 7 stands for a motor; 8 stands for a high-speed shear blade; 9 stands for a material inlet; and 10 stands for a material outlet.

FIG. 4B shows another structural form of FIG. 4A. Different structural forms are mainly selected according to different biomass raw material types and features, different ingredient types and features, different biochemical promoter types and features, and different product types and features. Numerals are the same as those in FIG. 4A.

The discharge valve is connected to a material inlet of the cyclic shear filtration linkage unit, and a material outlet of the cyclic shear filtration linkage unit is connected to a material inlet of the composite reaction tank through a pipeline valve; after cyclic shear filtration and ultrasonic enhanced dispersion are completed, the primary recycled product is turned into a secondary recycled product; the solid biomass portion in the secondary recycled product enters the filter residue tank and returns to be mixed with a newly added original biomass raw material for retreatment.

The liquid biomass portion in the secondary recycled product enters the filtrate tank and is transported to the concentration equipment for concentration.

Material heat and concentrated material waste heat in the biochemical reaction tank and the composite reaction tank are recovered and used, and concentrated liquid obtained after concentration is completed is automatically transported into a concentrate tank as a finished product to be packaged.

According to different biomass raw materials, small molecule organic water-soluble fertilizer, small molecule organic liquid feed, small molecule nutritional food, and health-care products can be respectively made through the complete set of equipment system for biochemical synthesis of biomass.

In a more specific implementation of the present disclosure, the recycling system for the biomass raw material includes:

As shown in FIG. 2, original biomass and a water-containing material in wastes of the original biomass are made into a water-containing material in 1 through known purification such as impurity removal, and crushing and pulping on kitchen wastes.

The heating subsystem 2-1 heats the biomass water-containing material tank 1 and stops heating when the temperature reaches 80° C.

The water-containing material heated to 80° C. is transported to the material inlet of 2. After feeding, a biochemical promoter and macro, medium, and micro elements are sequentially quantitatively transported to the material inlet of 2 through 2-3 for feeding. An amount of the biochemical promoter is based on controlling a pH value of the material in the biochemical synthesis reaction tank 2 to 2. An adding amount of the macro, medium, and micro elements is controlled in accordance with the national standard: $N+P_2O_5+K_2O{\geq}8\%$, organic matter $\geq10\%$, and micro elements (in terms of metal) $\geq2\%$. Small molecule organic fertilizer can be produced.

After the adding of all the materials in 2 is completed, the heater in 2 is turned on for heating. The heating is stopped when the temperature reaches 120° C. Then, 2-4 is turned on for pressurization. The pressurization is stopped when the pressure reaches 0.8 Mpa. The pressurization is stopped when the temperature inside the tank is maintained at 120° C. and the pressure inside the tank is maintained at 0.8 Mpa. After the temperature and the pressure are maintained for 2 hours, a material outlet of 2 is opened after the pressure is reduced through a pressure reduction valve, so that the materials in 2 are automatically discharged to a material inlet of 3 at one time for feeding. A material outlet of 3 is connected to a material inlet of 4 through a pipeline, and a material outlet of 4 is connected to the material inlet of 3 through a pipeline, for cyclic shear filtration. A speed of a cyclic shear machine in 4 is controlled at 6000 rpm; a cyclic filtration speed is controlled at 10 m/h; and cyclic shear filtration time is controlled at 2 h. An ultrasonic frequency in 3 is controlled at 20 kHz, and a sound intensity is controlled at 10 W/cm2.

After the cyclic shear process is completed, filter residues from a filter in 4 are returned to be mixed with a new material for retreatment. Filtrate is transported into 5 through a pipeline pump valve for known evaporative concentration. Excess hot water obtained by evaporation is transported into the heat pump 2-1 through a pipeline pump valve from a water outlet of 6, to provide heat for the heat pump. Concentrated liquid in 6 enters 7 through the material outlet and becomes small molecule organic fertilizer that meets the national standard.

Power for driving the subsystem involved in the above entire treatment process is provided by an intelligent control cabinet under automatic control.

In a more specific implementation of the present disclosure, the recycling system for the biomass raw material, as shown in FIG. 2, FIG. 3, and FIG. 4A-4B, further includes:

The water-containing material in the original biomass raw material 1 is pulp made by crushing and pulping fresh biomass fruit residues, fresh biomass vegetable residues, and fresh biomass bean residues that are produced during production in food manufacturers such as juice factories, vegetable juice factories, and bean product factories.

The heating subsystem 2-1 heats the biomass water-containing material 1 and stops heating when the temperature reaches 60° C.

The water-containing material heated to 60° C. is transported to the material inlet of 2. After feeding, the biochemical promoter is added through 2-3, and an adding amount is controlled according to a pH value=3 of the pulp. The valve of the material inlet of 2 is closed. The stirrer of 2 is used to stir and mix the materials uniformly. Then, the heater in 2 is turned on to heat the pulp in 2. The temperature is maintained at 60° C. 2-4 is turned on to perform pressurization to 0.6 Mpa, and then the pressurization is stopped. The temperature and the pressurization are maintained for 3 h. After the pressure is reduced through the pressure reduction valve, the material outlet of 2 is opened to discharge the pulp in 2 to the material inlet of 3 at one time for feeding.

The material outlet of 3 is connected to the material inlet of 4 through a pipeline, and material outlet of 4 is connected to the material inlet of 3 through a pipeline for cyclic shear filtration treatment. The cyclic shear filtration time is controlled at 2.5 h. An ultrasonic frequency in 3 is controlled at 25 kHz. A sound intensity is controlled at 8 W/cm². The speed of the cyclic shear machine in 5 is controlled at 5000 rpm. The cyclic filtration speed is controlled at 15 m/h. The cyclic shear filtration time is controlled at 2.5 h.

After the cyclic shear filtration is completed, the filter residues are returned to be mixed with a new material for retreatment, and the filtrate is transported to 5.

The known evaporative concentration is performed on the pulp in 5, and the excess hot water obtained by evaporation enters 6. Then, the hot water enters the heat pump 2-1 from a water outlet of 6 through a pipeline pump valve to provide heat for the heat pump. The concentrated liquid in 5 enters 7 and is prepared into fruit juice, vegetable juice, and bean juice raw materials with a micro-nano particle size by using fruit residues, vegetable residues, and bean dregs of factories such as juice factories, vegetable juice factories, and bean product factories.

The power equipment involved in the entire treatment process is automatically controlled by the intelligent control cabinet.

In a more specific implementation of the present disclosure, the recycling system for the biomass raw material further includes:

The water-containing material of the original biomass raw material 1 is pulp with a water content of about 90% prepared by performing impurity removal, and crushing and pulping on fresh straws, fallen fruits in fruit cultivation, or the like.

The heating subsystem 2-1 heats the biomass water-containing material 1 and stops heating when the temperature reaches 75° C.

The water-containing material heated to 75° C. is transported to the material inlet of 2. After feeding, the biochemical catalytic promoter is quantitatively added through 2-3, and an adding amount is controlled according to a pH value=2 of the pulp. The valve of the material inlet of 2 is closed. The stirrer of 2 is used to stir and mix the materials uniformly. Then, the heater in 2 is turned on to heat the pulp, and the heating is stopped until the temperature of the pulp in 2 is 125° C. 2-4 is turned on to perform pressurization to 0.7 Mpa, and then the pressurization is stopped. The temperature and the pressurization are maintained for 2.5 h. After the pressure is reduced through the pressure reduction valve, the material outlet of 2 is opened to discharge the pulp in 2 to the material inlet of 3 at one time for feeding.

The material outlet of 3 is connected to the material inlet of 4 through a pipeline, and material outlet of 4 is connected to the material inlet of 3 through a pipeline for cyclic shear filtration treatment. The cyclic shear filtration time is controlled at 2 h. An ultrasonic frequency in 3 is controlled at 30 kHz. A sound intensity is controlled at 5 W/cm2. The speed of the cyclic shear machine in 5 is controlled at 4000 rpm. The cyclic filtration speed is controlled at 30 m/h. The cyclic shear filtration time is controlled at 3 h.

After the cyclic shear filtration is completed, the filter residues are discharged through the material outlet of 4-1 and are returned to be mixed with a new material for cyclic treatment. The pulp subjected to ultrasonic enhanced dispersion in 3 is transported from 4-2 to 5.

The known evaporative concentration is performed on the pulp in 5 until the water content is 80%, and the excess hot water obtained by evaporation enters 6. Then, the hot water enters the heat pump 2-1 from a water outlet of 6 through a pipeline pump valve to provide heat for the heat pump. The concentrated liquid in 5 automatically enters 7 and is used as an energy raw material of liquid pig feed. Sodium hydroxide is added to neutralize the pH to 6, and known preservatives or known lactic acid bacteria are added as the energy raw material of the liquid pig feed. The particle size reaches a micro-nano level, which is conducive to rapid absorption of pigs for nutrition.

Although the present disclosure has been described in conjunction with the specific embodiments of the present disclosure, many substitutions, modifications, and transformations of these embodiments will be apparent to those of ordinary skill in the art.

The embodiments of the present disclosure aim to cover all such substitutions, modifications, and transformations falling within the broad scope of the attached claims. Therefore, any omission, modification, equivalent substitution, and improvement made within the spirit and principle of the embodiments of the present disclosure shall fall within the protection scope of the present disclosure.

What is claimed is:

1. A recycling method for a biomass raw material, wherein the recycling method for the biomass raw material comprises:

heating an original biomass raw material in a first stage heating to reach a first preset temperature, the first preset temperature is 70-130° C., the original biomass raw material after the first stage heating is fed into a biochemical synthesis reaction tank, with a biochemical promoter and macro, medium, and micro element additives into the biochemical synthesis reaction tank; a second stage heating is performed in the biochemical synthesis reaction tank to reach a second preset temperature, and performing biochemical reaction and/or synthesis reaction on the original biomass raw material according to a preset pressure, to obtain a primary recycled product of the original biomass raw material; the second preset temperature is controlled at 70° C. to 150° C.; the preset pressure is controlled at 0.5 Mpa to 1 Mpa; and a reaction time is controlled at 0.5 h to 4 h; a temperature difference exists between the first preset temperature and the second preset temperature;

the first stage heating and the second stage heating are independent of each other;

performing cyclic shear and completing organic transformation of mineral elements, filtration and/or ultrasonic enhanced dispersion on the primary recycled product to turn the primary recycled product into a secondary recycled product, wherein the secondary recycled product comprises a solid biomass portion and a liquid biomass portion; the solid biomass portion is returned to the second stage heating; and the liquid biomass portion waits for packaging or the liquid biomass portion waits for packaging after being concentrated or through an evaporative concentration stage.

2. The recycling method for the biomass raw material according to claim 1, wherein during the performing cyclic shear, filtration and/or ultrasonic enhanced dispersion on the primary recycled product, some filter residues that do not enter a next step are produced; and the filter residues are returned to the second stage heating performed according to the second preset temperature, the preset pressure, and the reaction time for further treatment.

3. The recycling method for the biomass raw material according to claim 1, further comprising a heat recovery and use step:

using and recovering heat generated in the second stage heating, the cyclic shear and ultrasonic enhanced dispersion, and the evaporative concentration stage and heat generated in the material itself, and providing heat energy to the first stage heating and the second stage heating through a heat exchange subsystem.

4. The recycling method for the biomass raw material according to claim 1, further comprising:

screening and classifying the original biomass raw material to obtain a screening and classification result;

during the performing biochemical reaction and/or synthesis reaction on the heated biomass raw material according to the second preset temperature, the preset pressure, and the reaction time, adding, according to classification result, an element and component that are matched with the classification result; and when the biomass liquid portion is concentrated and waits for packaging, transporting the biomass liquid portion to a finished product line for packaging according to the element and component that are matched with the classification result.

* * * * *